(12) United States Patent
Kweon et al.

(10) Patent No.: US 7,952,606 B2
(45) Date of Patent: May 31, 2011

(54) APPARATUS FOR PROVIDING OMNIDIRECTIONAL STEREO IMAGE WITH SINGLE CAMERA

(75) Inventors: In So Kweon, Daejeon (KR); Gi Jeong Jang, Seoul (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 1406 days.

(21) Appl. No.: 11/440,677

(22) Filed: May 24, 2006

(65) Prior Publication Data

US 2006/0268103 A1  Nov. 30, 2006

(30) Foreign Application Priority Data

May 26, 2005 (KR) ................. 10-2005-0044467

(51) Int. Cl.
*H04N 7/00* (2006.01)
*H04N 13/02* (2006.01)

(52) U.S. Cl. .......................... 348/36; 348/42

(58) Field of Classification Search .......... 348/36, 348/42, 46, 49, 343, 369, 37, 38, 39, 47, 348/51, 53, 64, 50, 52, 54, 55, 56, 57, 58, 348/59, 60, 72, 70; 382/153, 154
See application file for complete search history.

(56) References Cited

U.S. PATENT DOCUMENTS

| | | | |
|---|---|---|---|
| 7,126,630 B1 * | 10/2006 | Lee et al. ................. | 348/218.1 |
| 7,710,451 B2 * | 5/2010 | Gluckman et al. .......... | 348/46 |
| 2003/0043261 A1 * | 3/2003 | Gianchandani et al. ...... | 348/36 |
| 2003/0156187 A1 * | 8/2003 | Gluckman et al. .......... | 348/46 |

FOREIGN PATENT DOCUMENTS

| | | |
|---|---|---|
| JP | 2000232651 | 8/2000 |
| JP | 2007531333 | 11/2007 |
| WO | 2005013001 A2 | 2/2005 |

OTHER PUBLICATIONS

Shree et al., Folded Catadioptric Cameras, 1999 IEEE, 217-223.*
Ollis, Mark et al., "Analysis and Design of Panoramic Stereo Vision Using Equi-Angular Pixel Cameras", The Robotics Institute, Carnegie Mellon University, pp. 7, 10, 11, and 22-41 (Jan. 1999).

(Continued)

*Primary Examiner* — Behrooz Senfi
(74) *Attorney, Agent, or Firm* — Nixon Peabody LLP

(57) ABSTRACT

An apparatus for providing an omnidirectional stereo image with a single camera includes a first reflector reflecting a first omnidirectional view viewed from a first viewpoint, a second reflector positioned to be coaxial with and separated from the first reflector to reflect a second omnidirectional view viewed from a second viewpoint, a third reflector positioned to be coaxial with the first and second reflectors to reflect the second omnidirectional view reflected by the second reflector, wherein the second and third reflectors have a folded structure satisfying a single viewpoint constraint, and an image sensor positioned to be coaxial with the first, second and third reflectors to capture an omnidirectional stereo image containing the first omnidirectional view reflected by the first reflector and the second omnidirectional view reflected by the third reflector, and output the captured omnidirectional stereo image, wherein shapes of the first, second, and third reflectors and a relative positional relationship between the first, second, third reflectors and the image sensor satisfy the single viewpoint constraint for the first viewpoint and for the second viewpoint. The apparatus provides a high three-dimensional recovery resolution, accomplishes compactness, and facilitates search of corresponding points in two images.

6 Claims, 9 Drawing Sheets

OTHER PUBLICATIONS

Office Action mailed Nov. 14, 2008, KR Application No. 200610078454.6.

Office Action mailed Apr. 15, 2009, JP Application No. 2006-144335.

* cited by examiner

FIG. 2
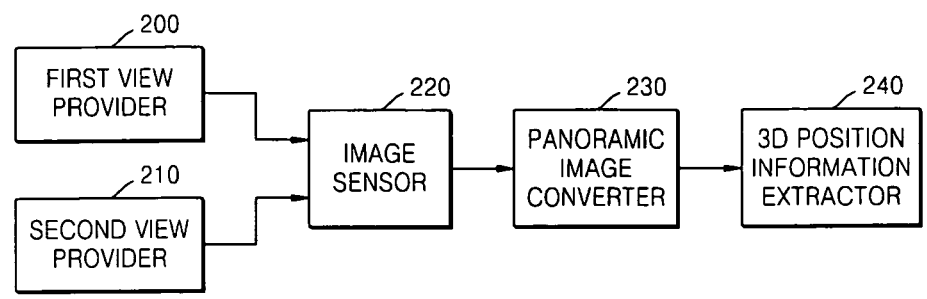
FIG. 3A
FIG. 3B
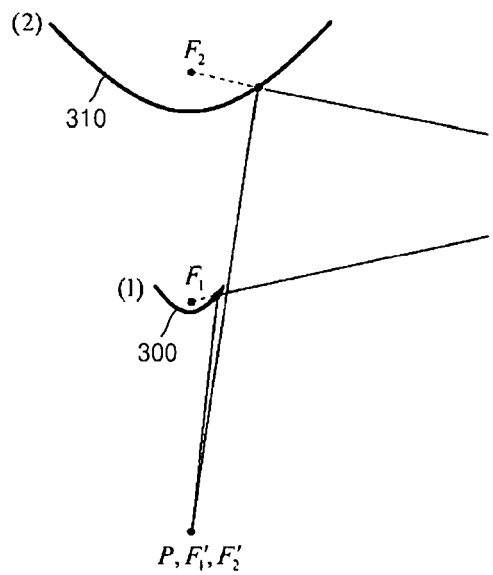
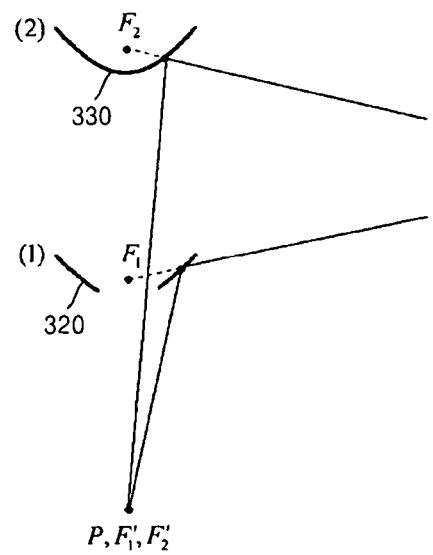

APPARATUS FOR PROVIDING OMNIDIRECTIONAL STEREO IMAGE WITH SINGLE CAMERA

CROSS-REFERENCE TO RELATED PATENT APPLICATIONS

This application claims the benefit of Korean Patent Application No. 10-2005-0044467, filed on May 26, 2005, in the Korean Intellectual Property Office, the disclosure of which is incorporated herein in its entirety by reference.

BACKGROUND OF THE INVENTION

1. Field of the Invention

The present invention relates to an apparatus for providing an omnidirectional stereo image needed to infer three-dimensional (3D) information using a single camera, and more particularly, to an apparatus for providing an omnidirectional stereo image with a single camera, which provides a wide stereo baseline, decreases its size, and facilitates correspondence search in a stereo image.

2. Description of the Related Art

Stereo vision systems using a camera are used to infer three-dimensional (3D) information from two images. In particular, omnidirectional stereo systems provide 3D information on a 360-degree panorama. Such systems can be used in the field of 3D figure measurement, virtual reality, environment recognition of intelligent robots, monitoring and surveillance systems, military detection systems, etc.

In omnidirectional stereo systems, 3D recovery is accomplished by identifying parallax between two panoramic images obtained at two different viewpoints. The two omnidirectional images can be obtained using two cameras or a single camera and mirrors. When two cameras are used, an error may occur during 3D recovery due to differences in physical characteristics, such as a difference in focal length and misalignment of imaging elements like a charge-coupled device (CCD) and a mirror, between the two camera systems. Accordingly, using a single camera stereo system is known as more effective in various terms.

To easily implement a stereo vision system using a mirror, the shape of the mirror and a relative positional relationship between the mirror and a camera should satisfy a single viewpoint constraint. When this condition is not satisfied, it becomes complicated to extract 3D information from two images. In particular, a plane mirror, an ellipsoidal mirror, a hyperboloidal mirror, and a paraboloidal mirror can satisfy the condition of a single viewpoint constraint and support an omnidirectional system.

FIG. 1 is a conceptual diagram of a system using a hyperboloidal mirror 100 among single-camera omnidirectional mono systems satisfying a single viewpoint. An image of a 3D-space object 110 reflected by the hyperboloidal mirror 100 is projected on an image plane 130 of, for example, a CCD via an effective pinhole 120 of a camera. The image reflected by the hyperboloidal mirror 100 is the same as an image viewed from an effective viewpoint 140.

Meanwhile, conventional single-camera omnidirectional stereo systems are implemented by placing a double-lobed mirror in front of a camera. However, a distance between effective viewpoints in the mirror is very short, and therefore, a depth resolution is very low. Moreover, an apparatus such as a robot requiring a single-camera omnidirectional stereo system is demanded to be small. Accordingly, a single-camera omnidirectional stereo system suitable to compactness is desired. In addition, since two images obtained in a conventional single-camera omnidirectional stereo system have a resolution difference between corresponding points, ability to find corresponding points in the two images may be decreased when the resolution of the obtained images is low. Therefore, a process of compensating for a resolution difference between the two images is desired.

SUMMARY OF THE INVENTION

The present invention provides an apparatus for providing an omnidirectional stereo image with a single camera, by which a distance between effective viewpoints is increased so that three-dimensional recovery resolution is increased.

The present invention also provides an apparatus for providing an omnidirectional stereo image with a single camera and a folded mirror to accomplish compactness.

The present invention also provides an apparatus for providing an omnidirectional stereo image with a single camera, by which corresponding points are easily detected even when there is a resolution difference between images obtained at two effective viewpoints, respectively.

According to an aspect of the present invention, there is provided an apparatus for providing a panoramic stereo image with a single camera. The apparatus includes a first reflector reflecting a first omnidirectional view viewed from a first viewpoint; a second reflector positioned to be coaxial with and separated from the first reflector to reflect a second omnidirectional view from a second viewpoint; a third reflector positioned to be coaxial with the first and second reflectors to reflect the second omnidirectional view reflected by the second reflector, wherein the second and third reflectors have a folded structure satisfying a single viewpoint constraint, and an image sensor positioned to be coaxial with the first, second and third reflectors to capture an omnidirectional stereo image containing the first omnidirectional view reflected by the first reflector and the second omnidirectional view reflected by the third reflector, and output the captured omnidirectional stereo image.

The first reflector and the third reflector may be connected in a one-body type unit.

The apparatus may further include an omnidirectional image provided from the image sensor to a first panoramic image corresponding to the first view and a second panoramic image corresponding to the second view, and a three-dimensional position information extractor searching for corresponding points in the first and second panoramic images and extracting three-dimensional position information from a positional difference between the searched corresponding points The second reflector may have a bore which is passed through by rays of light reflected by the first and third reflectors, wherein the bore of the second reflector is located on a connection line of the first viewpoint and the second viewpoint.

BRIEF DESCRIPTION OF THE DRAWINGS

The above and other features and advantages of the present invention will become more apparent by describing in detail exemplary embodiments thereof with reference to the attached drawings in which:

FIG. 2 is a block diagram of an apparatus for providing 3D position information from an omnidirectional stereo system;

FIGS. 3A and 3B are conceptual diagrams of the arrangement of a camera and mirrors to obtain omnidirectional stereo image with a single camera;

DETAILED DESCRIPTION OF THE INVENTION

Figure 1:
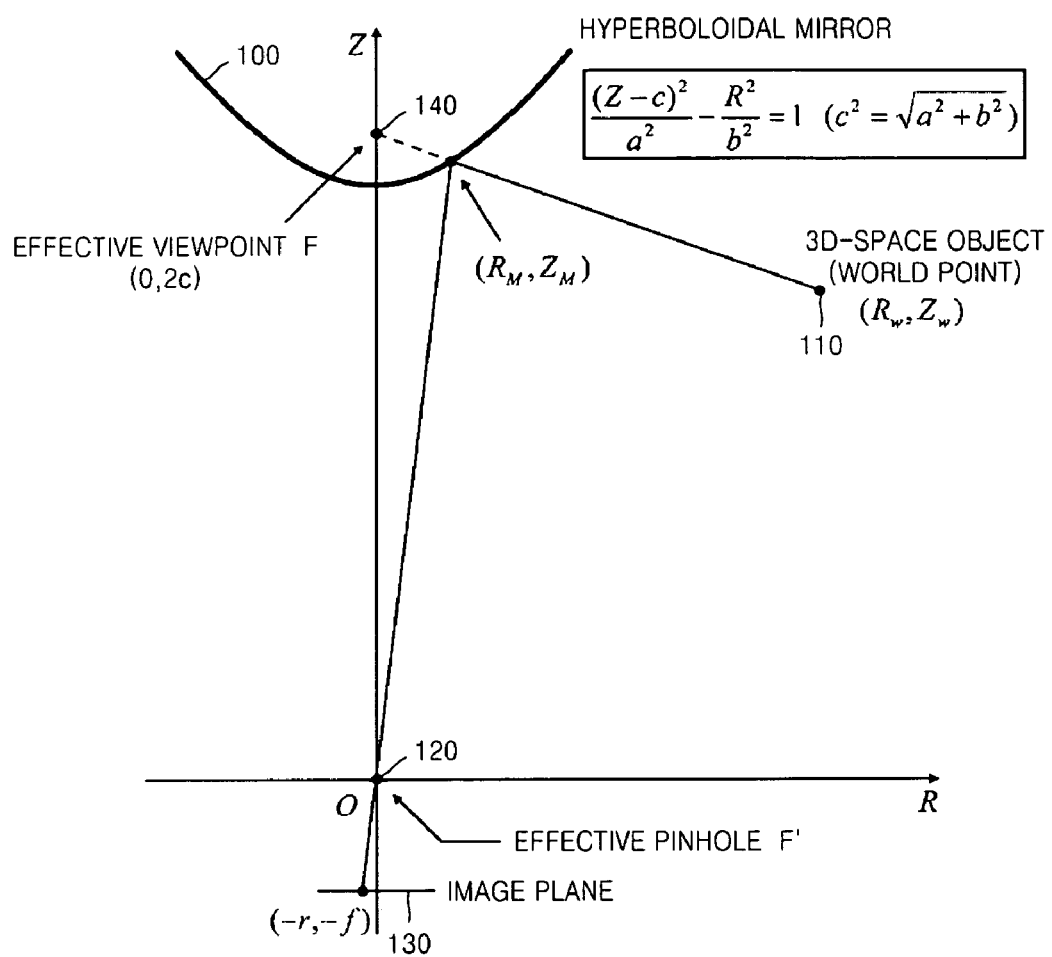
FIG. 1 is a conceptual diagram of a conventional omnidirectional mono system using a hyperboloidal mirror satisfying a single viewpoint constraint.
Figure 4A:
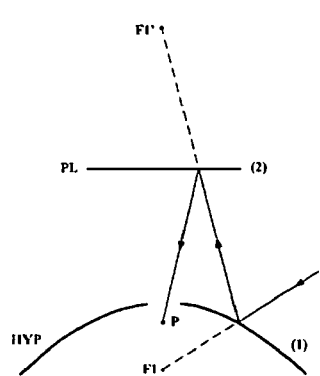
FIGS. 4A through 4I are conceptual diagrams of the arrangement of a mirror in a folded omnidirectional mono system satisfying the single viewpoint constraint.
Figure 4B:
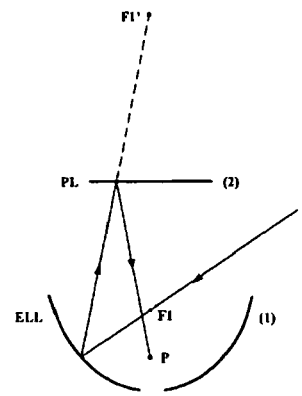
Figure 4C:
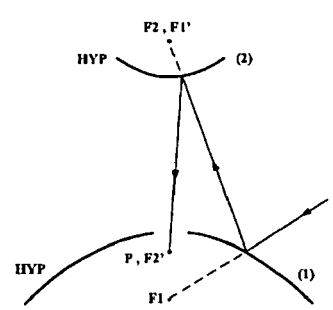
Figure 4D:
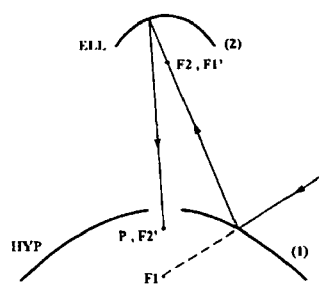
Figure 4E:
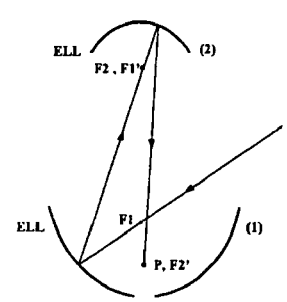
Figure 4F:
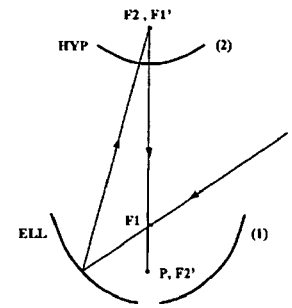
Figure 4G:
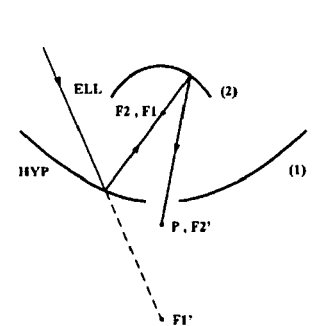
Figure 4H:
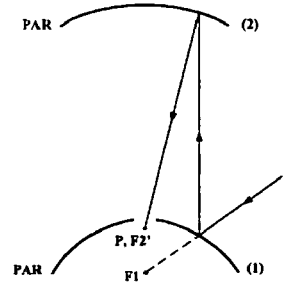
Figure 4I:
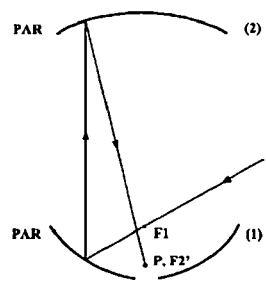
Figure 5A:
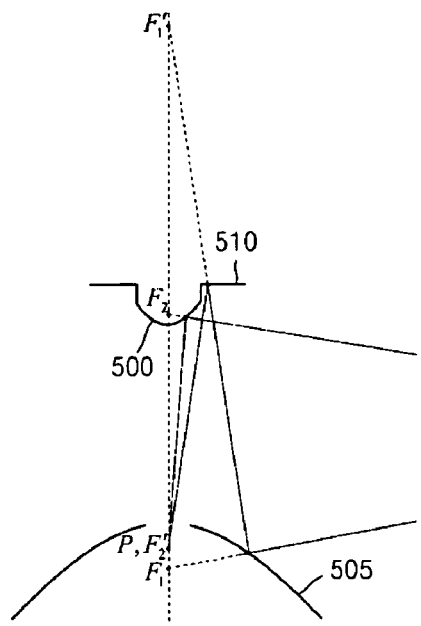
FIGS. 5A through 5D are conceptual diagrams of the arrangement of a camera and a mirror in a folded-type apparatus for providing an omnidirectional stereo image with a single camera according to an embodiment of the present invention.
Figure 5B:
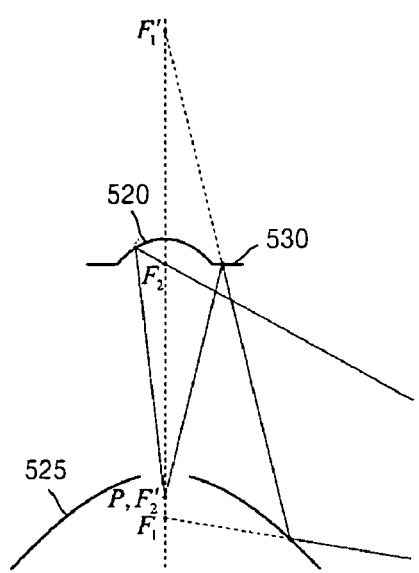
Figure 5C:
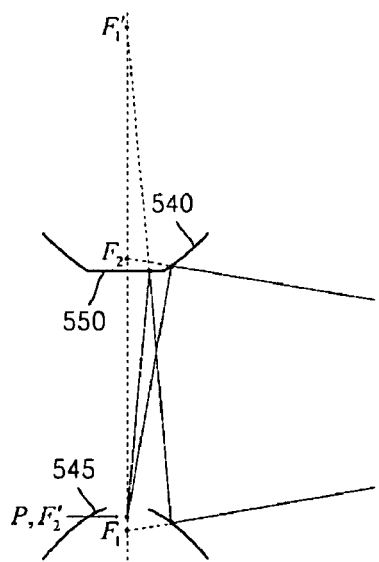
Figure 5D:
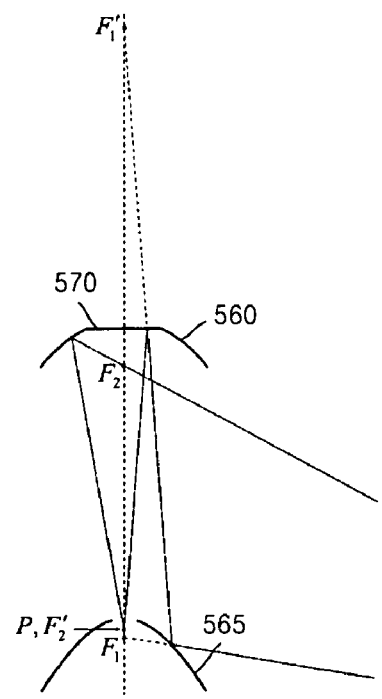

Hereinafter, exemplary embodiments of the present invention will be described in detail with reference to the attached drawings.

FIG. 2 is a block diagram of an apparatus for providing 3D position information from an omnidirectional stereo system. The apparatus includes a first view provider 200, a second view provider 210, an image sensor 220, a panoramic image converter 230, and a three-dimensional (3D) position information extractor 240.

Each of the first view provider 200 and the second view provider 210 reflects 360-degree surroundings viewed from an effective viewpoint to transfer a reflected image to the image sensor 220 like a charge-coupled device (CCD) of a camera. The first view provider 200 may include a single reflector while the second view provider 210 includes one or two reflectors. The shape and arrangement of the reflectors will be described later. The term "reflector" used in this specification indicates an object that reflects an image or a figure and usually denotes a mirror, but it is not restricted thereto in the present invention.

Two images reflected from the first and second view providers 200 and 210, respectively, are projected onto the image sensor 220. The image sensor 220 transmits a projected image to the panoramic image converter 230. The projected image includes a central image and a peripheral image which have a circle shape, which will be described later.

The panoramic image converter 230 converts the central image and the peripheral image, which are received from the image sensor 220, into panoramic images, respectively. For the conversion, the corresponding position in a circle-shape image for each position in an omnidirectional image is sampled and mapped to the position in the panoramic image. In particular, positions in a circle-shape image corresponding to positions in a panoramic image may be preset in a look-up table. The look-up table in which positions in a circle-shape input image are respectively mapped to positions in a panoramic image can be implemented by analyzing the structure of a camera-mirror system.

Meanwhile, when a resolution of the central image is different from that of the peripheral image, the panoramic image converter 230 may include a resolution compensation function, which will be described later, in order to facilitate search of corresponding points between two panoramic images.

The 3D position information extractor 240 searches for corresponding points between the two panoramic images provided by the panoramic image converter 230 and extracts 3D position information such as distance information of each object. Various methods including a window-based correlation search method may be used to search for the corresponding points. In addition, various conventional techniques including triangulation may be used to extract 3D information.

FIGS. 3A and 3B are conceptual diagrams of the arrangement of a camera and mirrors to obtain omnidirectional stereo image with a single camera.

In the arrangement illustrated in FIG. 3A, a mirror without a bore is used. A first reflector 300 and a second reflector 310 have effective viewpoints F1 and F2, respectively, and reflect an object in 3D space. In other words, the first reflector 300 transfers an omnidirectional image viewed from the effective viewpoint F1 to the image sensor 220 of the camera and the second reflector 310 transfers an omnidirectional image viewed from the effective viewpoint F2 to the image sensor 220. The first reflector 300 and the second reflector 310 correspond to the first view provider 200 and the second view provider 210, respectively, illustrated in FIG. 2. Meanwhile, to obtain both of a peripheral image and a central image, a reflective surface of the first reflector 300 must be smaller than that of the second reflector 310.

In the arrangement illustrated in FIG. 3B, a mirror having a bore is used. The functions of a first reflector 320 and a second reflector 330 are the same as those of the first and second reflectors 300 and 310 illustrated in FIG. 3A. However, a path in which an image is projected onto the image sensor 220 in the arrangement illustrated in FIG. 3B is different from that in the arrangement illustrated in FIG. 3A and a peripheral image and a central image are the reverse of those obtained in the arrangement illustrated in FIG. 3A. In other words, a central image is obtained from the first reflector 300 and a peripheral image is obtained from the second reflector 310 in the arrangement illustrated in FIG. 3A. In contrast, a central image is obtained from the second reflector 330 and a peripheral image is obtained from the first reflector 320 in the arrangement illustrated in FIG. 3B. Meanwhile, the diameter of the bore of the first reflector 320 is defined considering a curved surface thereof to obtain balanced peripheral and central images.

Through such arrangement of a camera and a mirror (i.e., through arranging two mirrors separate) and the shape of the mirror, a distance between the two effective viewpoints $F_1$ and $F_2$ can be increased. As a result, a depth resolution can also be increased.

It will be satisfactory if each of the first reflectors 300 and 320 and each of the second reflectors 310 and 330 are concave or convex mirrors and are coaxial with each other. In addition, it is preferable that the single viewpoint constraint is satisfied in order to facilitate extraction of 3D information. In other words, a first reflector and a second reflector may have a hyperboloid or ellipsoid and have the effective viewpoints $F_1$ and $F_2$, respectively. In addition, as illustrated in FIG. 3B, the first reflector may have a bore. As a result, there are 8 types of arrangement and shape of mirrors satisfying the single viewpoint constraint.

Alternatively, under the condition of the same stereo baseline (a distance between two effective viewpoints), folded type mirrors reducing an actual distance between mirror and an effective pinhole may be used. In other words, when a mirror is added to the arrangements illustrated in FIGS. 3A and 3B, a distance between the effective viewpoint F2 and an effective pinhole P can be reduced under the same effective viewpoint distance (i.e., the same distance between the effective viewpoints F1 and F2). As a result, the compactness of the apparatus can be accomplished. When an additional mirror is used, the apparatus can be smaller by folding an upper mirror to the vicinity of the height of a lens.

FIGS. 4A through 4I are conceptual diagrams of the arrangement of a mirror in a folded omnidirectional mono system satisfying the condition of a single viewpoint. In the drawings, PL, HYP, ELL, and PAR denote a plane mirror, a hyperboloidal mirror, an ellipsoidal mirror, and a paraboloidal mirror, respectively. An image of an object in 3D space is sequentially reflected by a first mirror and a second mirror and then projected onto an image plane. In other words, even though two mirrors are used, one of the two mirrors just reflects an image reflected from the other mirror. As a result, the image sensor 220 obtains only one image (viewed from the effective viewpoint F1). The relationship between the two mirrors is referred to as a folded relationship. In particular, FIGS. 4A through 4I illustrate the shapes and arrangement of two mirrors in the folded relationship satisfying the condition of a single viewpoint. Such systems use a folded mirror as the second mirror so that a distance between the effective pinhole P and the effective viewpoint F1 can be reduced.

FIGS. 5A through 5D are conceptual diagrams of the arrangement of a camera and mirrors in a folded-type apparatus for providing an omnidirectional stereo image with a single camera according to an embodiment of the present invention. FIGS. 5A through 5D illustrate the topologies of the folded relationship between each of second reflectors 505, 525, 545, and 565 and each of third reflectors 510, 530, 550, and 570. The topologies illustrated in FIGS. 5A through 5D use a topology illustrated in FIG. 4A in common, but an hyperboloidal mirror is used for each of first reflectors 500 and 540 illustrated in FIGS. 5A and 5C and an ellipsoidal mirror is used for each of first reflectors 520 and 560 illustrated in FIGS. 5B and 5D. Moreover, the first reflectors 500 and 520 are disposed at a central place in the topologies illustrated in FIGS. 5A and 5B while the first reflectors 540 and 560 are disposed at an outer place in the topologies illustrated in FIGS. 5C and 5D. In other words, each of the first reflectors 500, 520, 540 and 560 corresponds to the first view provider 200 illustrated in FIG. 2 and each of the second reflectors 505, 525, 545, and 565 and each of the third reflectors 510, 530, 550, and 570 form a set corresponding to the second view provider 210 illustrated in FIG. 2. Meanwhile, the diameter of a bore of a reflector is defined considering a curved surface thereof to obtain a peripheral image and a central image which are balanced with each other.

With respect to each of the nine topologies respectively illustrated in FIGS. 4A through 4I, four types of topologies illustrated in FIGS. 5A through 5D may be present. Consequently, there exist 36 types of arrangement and shape of reflectors in a folded-type apparatus for providing omnidirectional stereo images with a single camera according to the present invention.

For clarity of the description, the first reflectors 500, 520, 540 and 560 are placed at the same heights as the third reflectors 510, 530, 550, and 570, respectively, in FIGS. 5A through 5D, but the present invention is not restricted thereto. The first reflectors 500, 520, 540 and 560 may be placed at different heights than the third reflectors 510, 530, 550, and 570, respectively.

Figure 6A:
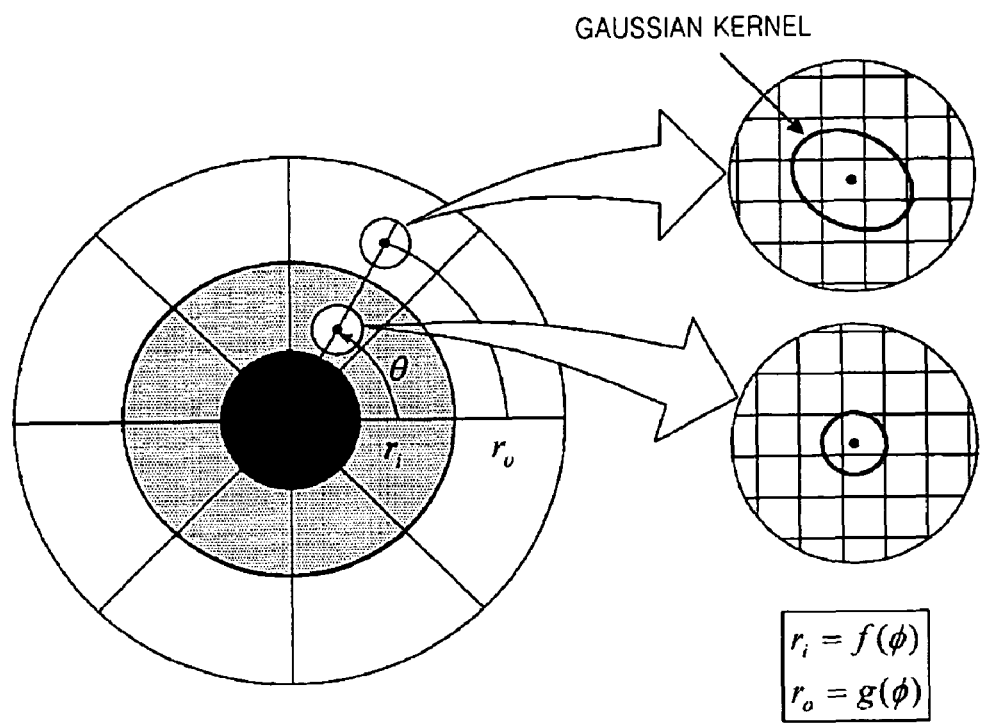
FIGS. 6A and 6B are conceptual diagrams of an image obtained in an embodiment of the present invention.
Figure 6B:
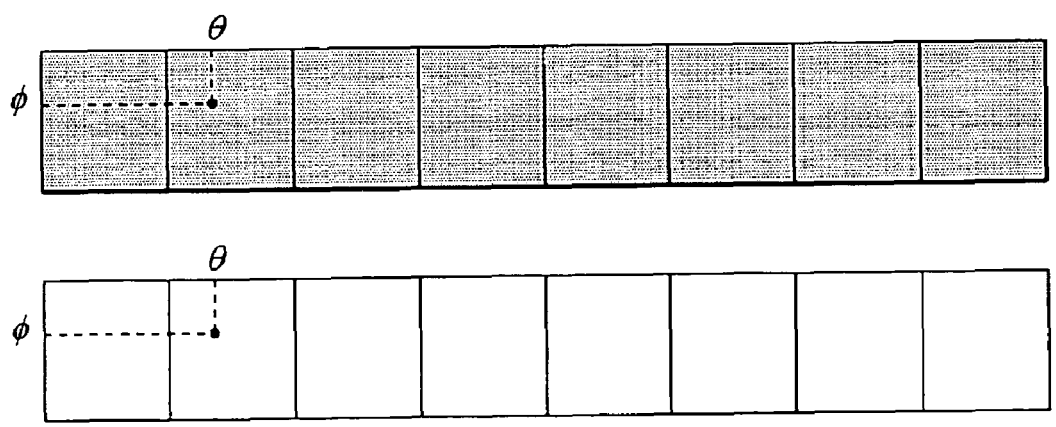

FIGS. 6A and 6B are conceptual diagrams of an image obtained in an embodiment of the present invention. Any omnidirectional stereo system having a single camera and at least one reflector which are coaxial with each other receives a stereo image through a central region and a peripheral region, as illustrated in FIG. 6A. Such system is most advantageous in that since all epipolar lines are simply placed in a radial shape, an image having a form illustrated in FIG. 6A can be easily converted into a panoramic image having parallel epipolar lines.

Referring to FIG. 6A, $r_i$ and $r_o$ correspond to $\Phi$. When surroundings having an effective viewpoint corresponding to a central image as an origin are expressed in spherical coordinates (r, $\theta$, $\Phi$), $r_i$ and $\Phi$ have a relationship defined by $r_i=f(\Phi)$. Similarly, when surroundings having an effective viewpoint corresponding to a peripheral image as an origin are expressed in spherical coordinates (r, $\theta$, $\Phi$), $r_o$ and $\Phi$ have a relationship defined by $r_o=g(\Phi)$. The functions f( ) and g( ) can be obtained from the shape of a reflector, i.e., a mirror.

In these stereo system, two images respectively obtained at two effective viewpoints have different resolutions. Accordingly, the performance of the 3D information extractor 240 searching for corresponding points in the two images may be decreased when the resolution of an image input to the panoramic image converter 230 is not high. For example, a resolution in a circular direction linearly decreases from an outer radius of a circle to a center of the circle. In addition, a resolution in a radial direction may also different according to the shape of a cross-section of the mirror.

To overcome these problems, the panoramic image converter 230 may compensate for a resolution difference using a scale-space sampling strategy. Resolution compensation can be accomplished when a Gaussian kernel G(s $\sigma$) along an x-axis and a y-axis in an image plotted in an orthogonal coordinate system is applied to an original image using an appropriate scale factor "s". Here, G denotes a Gaussian kernel, and "$\sigma$" is a reference standard deviation of the Gaussian kernel and is set to a minimum value for reducing aliasing and noise. An image obtained when s=2 is used has double resolution than an image obtained when s=4. In an embodiment of the present invention using this principle, an appropriate scale factor is applied to each position ($r_i$ or $r_o$,$\theta$) in each of a central image and a peripheral image, whereby resolution compensation is accomplished.

In an embodiment of the present invention, each of a first image and a second image, which are provided in a circular shape from the image sensor 220, is identified as a central image or a peripheral image. Next, $G(s_i^r\sigma)$ and $G(s_i^c\sigma)$ are applied to the central image in a radial direction and a circular direction, respectively. In addition, $G(s_o^r\sigma)$ and $G(s_o^c\sigma)$ are applied to the peripheral image in a radial direction and a circular direction, respectively. Here, $s_i^r$, $s_o^r$, $s_i^c$, and $s_o^c$ are defined as $$\max\left(1, \frac{dr_i}{d\phi} \bigg/ \frac{dr_o}{d\phi}\right), \max\left(1, \frac{dr_o}{d\phi} \bigg/ \frac{dr_i}{d\phi}\right), 1, \text{ and } \frac{r_o}{r_i},$$

respectively, and "$\sigma$" is set to a minimum value for reducing aliasing and noise. In other words, an image to which a Gaussian kernel will be applied is expressed in the circular direction (θ) and the radial direction ($r_i$ or $r_o$), and therefore, when a latitude Φ is given, a scale factor is defined with respect to the variables $r_i$, $r_o$, and θ. Here, subscripts "i" and "o" indicate "inner" and "outer" portions, respectively, and superscripts "r" and "c" indicate "radial" and "circular" directions, respectively. A Gaussian kernel for each of positions ($r_i$ or Φ,θ) and ($r_o$ or Φ,θ) are obtained by obtaining $s_i^r$, $s_o^r$, $s_i^c$, and $s_o^c$.

The above-described resolution compensation is performed by the panoramic image converter 230. In other words, the panoramic image converter 230 fundamentally converts two circular images illustrated in FIG. 6A into two panoramic images illustrated in FIG. 6B and may use a method of sampling in each circular image with respect to each position in a corresponding panoramic image for the conversion. To use the above-described resolution compensation function, the following scheme may be used first. The two circular images are identified as a central image and a peripheral image, respectively. A Gaussian kernel having a standard deviation $$\max\left(1, \frac{dr_i}{d\phi} \Big/ \frac{dr_o}{d\phi}\right)\sigma$$

in a radial direction and a standard deviation of σ in a circular direction are applied to a position in the central image, which corresponds to a position in a panoramic image, and the result of the application is mapped to the position in the panoramic image. Similarly, a Gaussian kernel having a standard deviation $$\max\left(1, \frac{dr_o}{d\phi} \Big/ \frac{dr_i}{d\phi}\right)\sigma$$

in a radial direction and a standard deviation of $$\frac{r_o}{r_i}\sigma$$

in a circular direction are applied to a position in the peripheral image, which corresponds to a position in another panoramic image, and the result of the application is mapped to the position in the panoramic image. When the above-described operation is completely performed on all of positions in the two panoramic images, panoramic image conversion ends. Here, a Gaussian kernel is applied as follows. On the basis of a position (or a pixel) in a circular image corresponding to a position in a panoramic image, a central pixel and adjacent pixels are respectively multiplied by weights of Gaussian kernels corresponding to the respective pixels and the results of the multiplications are summed. The result of the summation is a intensity (brightness) information value with respect to the position in the panoramic image. Meanwhile, coordinate conversion from a circular image to a panoramic image is possible in a cylindrical coordinate system as well as a spherical coordinate system. In other words, coordinate conversion is performed in the same manner in both of the spherical coordinate system and the cylindrical coordinate system, with exception that Φ in the spherical coordinate system is changed into "z" in the cylindrical coordinate system.

Figure 7:
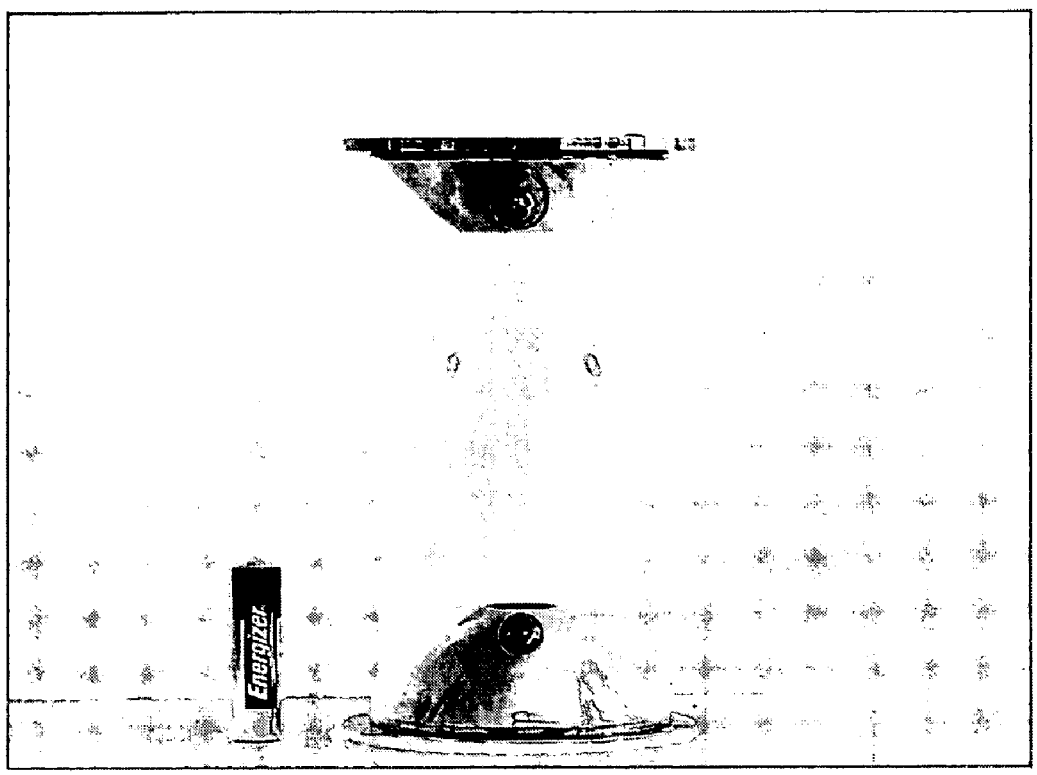
FIG. 7 is a photograph of an apparatus for providing an omnidirectional stereo image with a single camera, which is implemented according to an embodiment of the present invention.

FIG. 7 is a photograph of an apparatus for providing an omnidirectional stereo image with a single camera, which is implemented according to an embodiment of the present invention. Here, a camera is positioned inside a lower mirror, which is implemented according to the topology illustrated in FIG. 5C.

Figure 8:
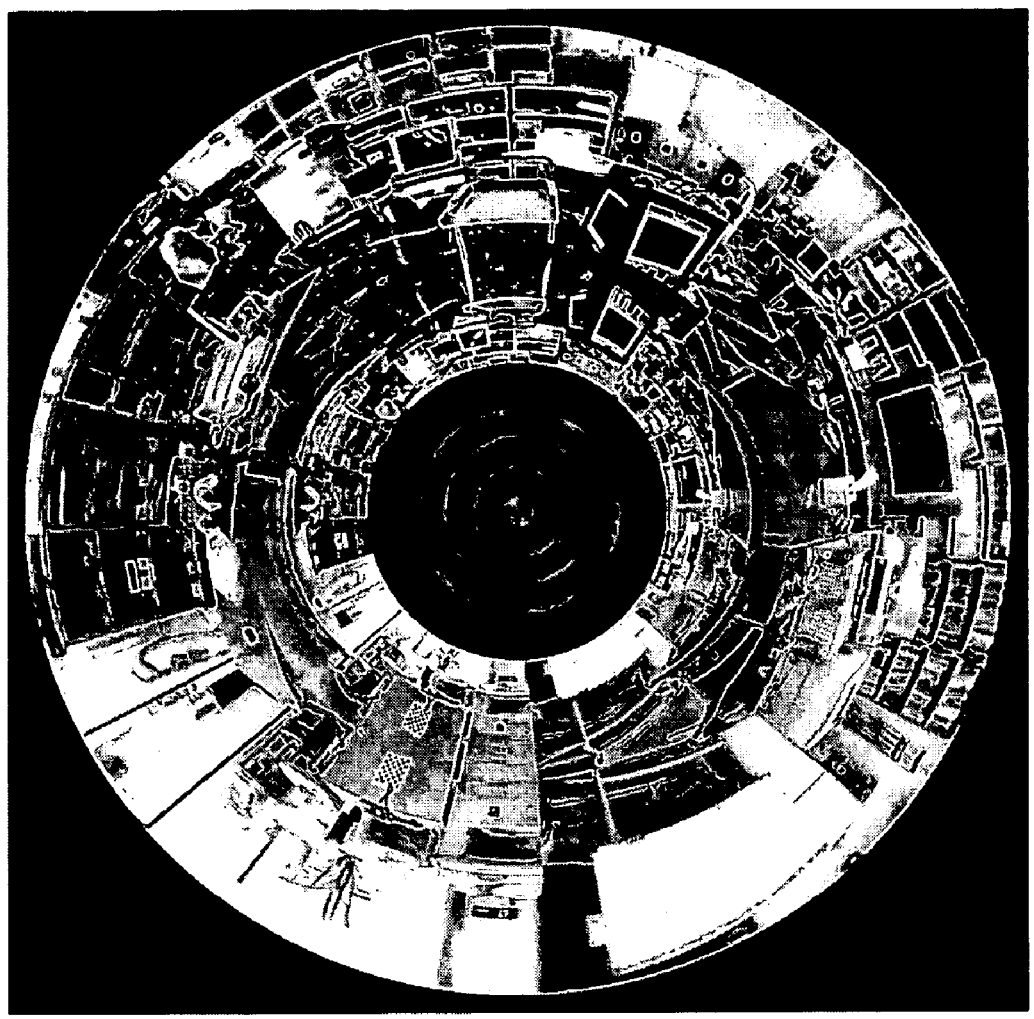
FIG. 8 illustrates an example of a captured omnidirectional stereo image of an environment, which is obtained from an apparatus for providing an omnidirectional stereo image with a single camera, according to an embodiment of the present invention.

FIG. 8 illustrates an example of a captured omnidirectional stereo image of an environment, which is obtained from an apparatus for providing an omnidirectional stereo image with a single camera, according to an embodiment of the present invention. A table and a robot in the vicinity of the apparatus and a desk and a shelf far away from the apparatus are projected onto a central portion and a peripheral portion. Referring to FIG. 8, each pair of corresponding points between the central portion and the peripheral portion exist on the same radial line and thus their epipolar lines also exist on the same radial line.

Figure 9A:
FIGS. 9A through 9C illustrate a higher view panoramic image, a lower view panoramic image, and a disparity map, respectively, to which the omnidirectional stereo image illustrated in FIG. 8 is converted.
Figure 9B:
Figure 9C:

FIGS. 9A through 9C illustrate a higher view panoramic image, a lower view panoramic image, and a disparity map, respectively, to which the panoramic stereo image illustrated in FIG. 8 is converted. The disparity map illustrated in FIG. 9C displays a difference between positions of corresponding points in the two panoramic images. In the disparity map, a brightness value is given in proportion to the magnitude of each difference. An object near the apparatus has a large positional difference according to a viewpoint and is thus expressed bright. An object far away from the apparatus has a small positional difference and is thus expressed dark. 3D information can be extracted from the disparity map.

Figure 10A:
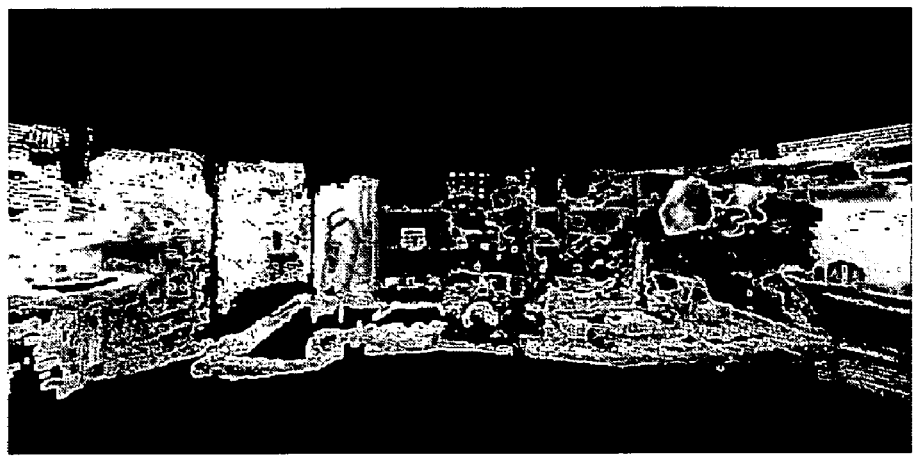
FIGS. 10A through 10C illustrate images including three-dimensional information, which are recovered from the images illustrated in FIGS. 9A through 9C.
Figure 10B:
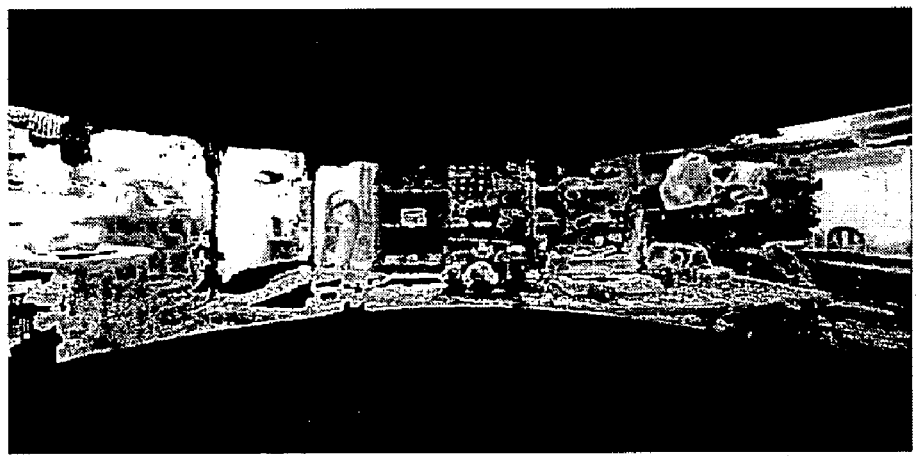
Figure 10C:
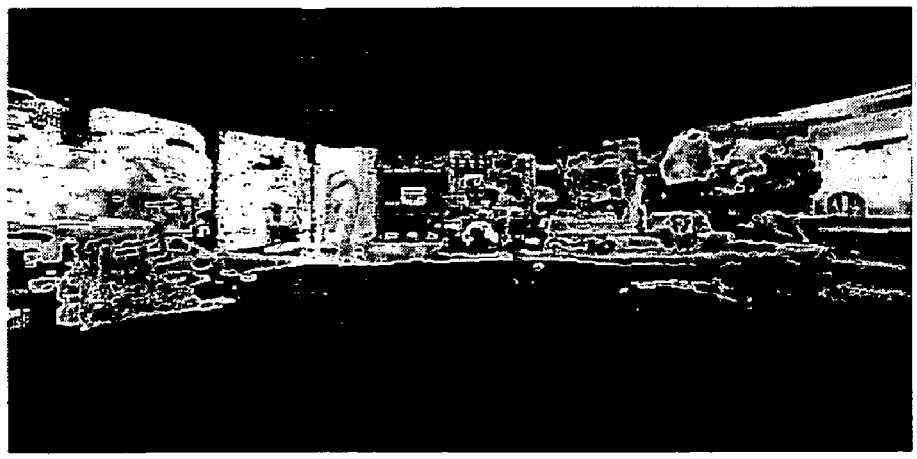

FIGS. 10A through 10C illustrate images including three-dimensional information, which are recovered from the images illustrated in FIGS. 9A through 9C. An image illustrated in FIG. 10A is obtained at a viewpoint 16-degree higher than a viewpoint of an image illustrated in FIG. 10B and an image illustrated in FIG. 10C is obtained at a viewpoint 16-degree lower than the viewpoint of the image illustrated in FIG. 10B. All of the three images illustrated in FIGS. 10A through 10C can be obtained based on 3D position information extracted from the panoramic images illustrated in FIGS. 9A and 9B.

According to the present invention, since a single camera is used, a recovery error caused by differences in physical characteristics between a plurality of cameras can be reduced. In addition, since a plurality of mirrors coaxial with the camera are used, epipolar lines between two images are located on the same line. As a result, a process of searching for corresponding points in two images is simplified. Moreover, a distance between effective viewpoints, which determines the accuracy of 3D recovery, can be increased by separating the plurality of mirrors. The present invention uses a single camera and a folded-type system, thereby accomplishing compactness. An error occurring due to a resolution difference between a peripheral image and a central image can be compensated for by using scale-space theory.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:
1. An apparatus for providing an omnidirectional stereo image with a single camera, the apparatus comprising:
    a first reflector reflecting a first omnidirectional view-viewed from a first viewpoint;

a second reflector positioned to be coaxial with and separated from the first reflector to reflect a second omnidirectional view viewed from a first viewpoint;

a third reflector positioned to be coaxial with the first and second reflectors to reflect the second omnidirectional view reflected by the second reflector, wherein the second and third reflectors have a folded structure satisfying a single viewpoint constraint; and an image sensor positioned to be coaxial with the first, second and third reflectors to capture an omnidirectional stereo image containing the first omnidirectional view reflected by the first reflector and the second omnidirectional view reflected by the third reflector, and output the captured omnidirectional stereo image, wherein shapes of the first, second, and third reflectors and a relative positional relationship between the first, second, third reflectors and the image sensor satisfy the single viewpoint constraint for the first viewpoint and for the second viewpoint.

2. The apparatus of claim 1, wherein the first reflector and the third reflector are connected in a one-body type unit.

3. The apparatus of claim 1, wherein the first reflector is a concave or convex mirror, and the second reflector is a concave or convex mirror, and the third reflector is one of a plane mirror, a concave mirror and a convex mirror.

4. The apparatus of claim 3, wherein the concave mirror is one of a hyperboloidal mirror, and ellipsoidal mirror, and a parabolodial mirror, and the convex mirror is one of a hyperboloidal mirror, and ellipsoidal mirror.

5. The apparatus of claim 1, further comprising:

a panoramic image converter converting the omnidirectional image provided from the image sensor to a first panoramic image corresponding to the first view and a second panoramic image corresponding to the second view, and a three-dimensional position information extractor searching for corresponding points in the first and second panoramic images and extracting three-dimensional position information from a positional difference between the searched corresponding points.

6. The apparatus of claim 1, wherein the second reflector has a bore which is passed through by rays of light reflected by the first and third reflectors, wherein the bore of the second reflector is located on a connection line of the first viewpoint and the second viewpoint.

* * * * *